(12) United States Patent
Bachand et al.

(10) Patent No.: US 6,578,116 B2
(45) Date of Patent: Jun. 10, 2003

(54) SNOOP BLOCKING FOR CACHE COHERENCY

(75) Inventors: Derek T. Bachand, Portland, OR (US); Paul Breuder, Beaverton, OR (US); Matthew A. Fisch, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/215,599

(22) Filed: Aug. 9, 2002

(65) Prior Publication Data

US 2002/0199068 A1 Dec. 26, 2002

Related U.S. Application Data

(63) Continuation of application No. 09/210,641, filed on Dec. 14, 1998, now Pat. No. 6,460,119, which is a continuation-in-part of application No. 08/999,242, filed on Dec. 29, 1997, now Pat. No. 6,209,068.

(51) Int. Cl.[7] .............................................. G06G 12/00
(52) U.S. Cl. ...................... 711/146; 711/141; 711/152; 711/140
(58) Field of Search ................................. 711/140, 141, 711/146, 168, 169, 167, 158, 154, 150–152; 710/129

(56) References Cited

U.S. PATENT DOCUMENTS

| | | | | |
|---|---|---|---|---|
| 5,426,765 A | * | 6/1995 | Stevens ........................ | 395/425 |
| 5,584,017 A | * | 12/1996 | Pierce et al. ................. | 395/473 |
| 5,623,628 A | * | 4/1997 | Brayton et al. .............. | 711/141 |
| 5,652,859 A | * | 7/1997 | Mulla et al. ................. | 395/473 |
| 5,694,575 A | * | 12/1997 | Oba et al. .................... | 395/473 |
| 5,737,758 A | | 4/1998 | Merchant | |
| 5,737,759 A | * | 4/1998 | Merchant .................... | 711/146 |
| 5,774,700 A | * | 6/1998 | Fisch et al. ................. | 395/555 |
| 5,778,438 A | * | 7/1998 | Merchant .................... | 711/146 |
| 5,796,977 A | * | 8/1998 | Sarangdhar et al. ........ | 395/406 |
| 5,802,575 A | * | 9/1998 | Greenley .................... | 711/144 |
| 5,875,467 A | | 2/1999 | Merchant | |
| 5,890,200 A | | 3/1999 | Merchant | |
| 5,893,151 A | | 4/1999 | Merchant | |
| 5,923,898 A | * | 7/1999 | Genduso et al. ............ | 395/826 |
| 5,991,855 A | * | 11/1999 | Jeddeloh et al. ............ | 711/146 |
| 6,049,849 A | * | 4/2000 | Arimilli et al. ............. | 711/133 |
| 6,065,101 A | * | 5/2000 | Gilda .......................... | 711/140 |
| 6,070,231 A | * | 5/2000 | Ottinger ...................... | 711/141 |
| 6,035,424 A | * | 6/2000 | Freerksen ................... | 714/40 |
| 6,078,981 A | * | 6/2000 | Hill et al. ................... | 710/200 |
| 6,108,735 A | * | 8/2000 | Pawlowski ................. | 710/107 |
| 6,202,125 B1 | | 3/2001 | Patterson et al. | |
| 6,202,506 B1 | * | 3/2001 | Richardson ................. | 710/129 |
| 6,209,068 B1 | | 3/2001 | Hill et al. ................... | 711/159 |
| 6,212,590 B1 | * | 4/2001 | Melo et al. ................. | 710/119 |
| 6,269,426 B1 | * | 7/2001 | Hetherington .............. | 711/140 |

OTHER PUBLICATIONS

Handy, J., *The Cache Memory Book*, Second Edition, Chapter 4, pp. 123–186, Academic Press, Inc., San Diego, California, 1998.

Pentium Pro Family Developer's Manual, vol. 1: Specification, Tabel of Contents Chapters 4.

Pentium Pro Processor System Architecture; Table of Contents Chapters 7; MindShare, Inc., Tom Shanley.

* cited by examiner

*Primary Examiner*—Do Hyun Yoo
*Assistant Examiner*—Kimberly McLean-Mayo
(74) *Attorney, Agent, or Firm*—Kenyon & Kenyon

(57) ABSTRACT

In a method of processing a bus transaction, an address is retrieved from the bus transaction and referred to a queue of pending transaction. A match indicator signal is returned from the queue. If the match indicator signal indicates a match, a snoop probe for the bus transaction is blocked.

10 Claims, 3 Drawing Sheets

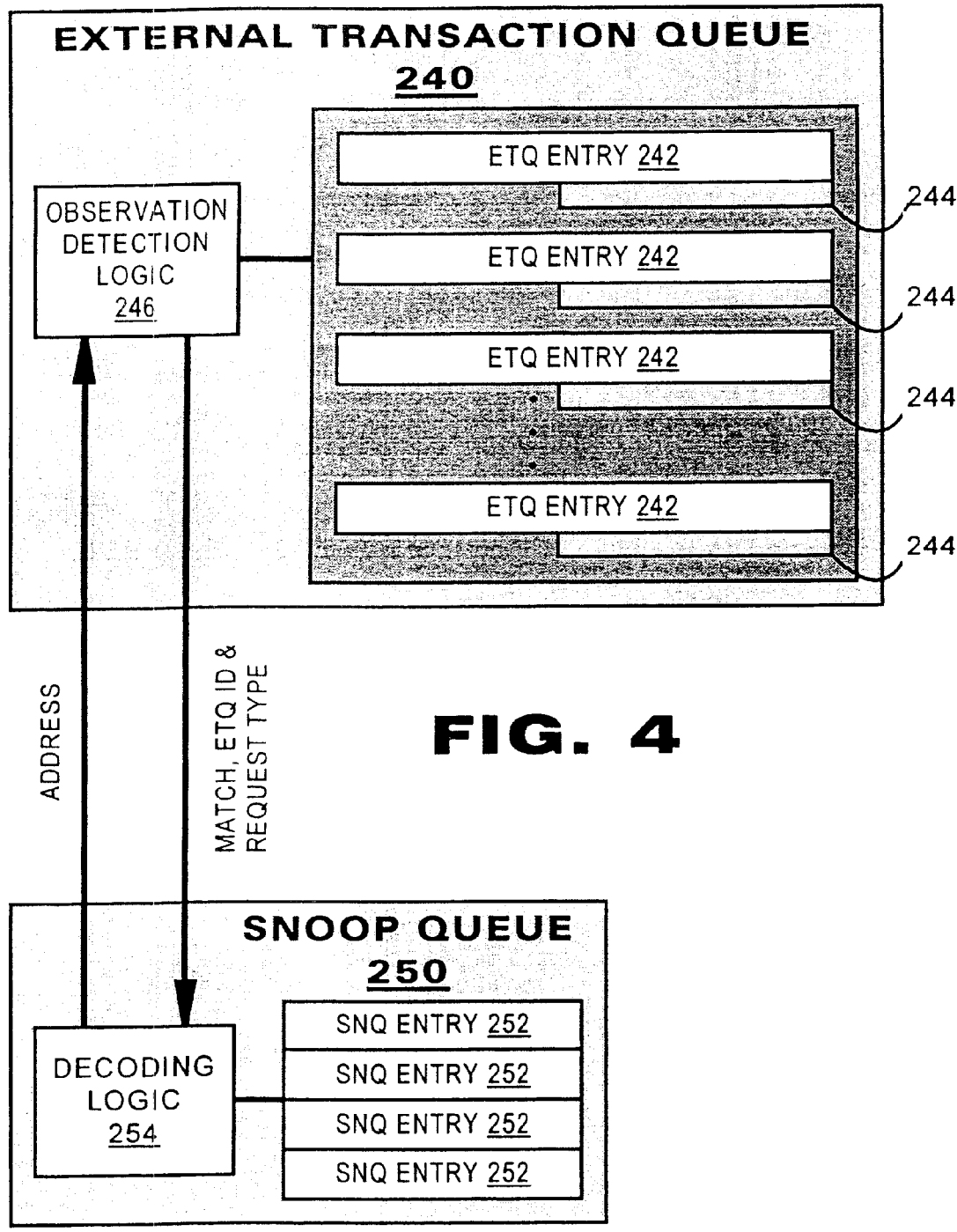

SNOOP BLOCKING FOR CACHE COHERENCY

CROSS-REFERENCE TO RELATED APPLICATION

This application is a continuation application that claims the benefit of U.S. patent application Ser. No. 09/210,641 (filed Dec. 14, 1998) (allowed Jun. 20, 2002), now U.S. Pat. No. 6,460,119 which is a continuation-in-part of U.S. patent application Ser. No. 08/999,242, now U.S. Pat. No. 6,209,068 (filed Dec. 29, 1997), which applications are incorporated herein in their entirety.

BACKGROUND

The present invention relates to a cache coherency technique in an agent using a pipelined bus.

As is known, many modern computing system employ a multi-agent architecture. A typical system is shown in FIG. 1. There, a plurality of agents 10–50 communicate over an external bus 60 according to a predetermined bus protocol. "Agents" may include general purpose processors, chipsets for memory and/or input output devices or other integrated circuits that process data requests. The bus 60 may be a "pipelined" bus in which several transactions may be in progress at once. Each transaction progresses through a plurality of stages but no two transactions are in the same stage at the same time. The transaction complete in order. With some exceptions, transactions generally do not "pass" one another as they progress on the external bus 60.

In a multiple-agent system, two or more agents may have need for data at the same memory location at the same time. The agents 1–50 operate according to cache coherency rules to ensure that each agent 10 uses the most current copy of the data available to the system. According to many cache coherency systems, each time an agent 10 stores a copy of data, it assigns to the copy a state indicating the agent's rights to read and/or modify the data.

For example, the Pentium® Pro processors commercially available from Intel Corporation, operates according to the "MESI" cache coherency scheme. Each copy of data stored in an agent 10 is assigned one of four states including:

Invalid—Although an agent 10 may have cached a copy of the data, the copy is unavailable to the agent. The agent 10 may neither read nor modify an invalid copy of data.

Shared—The agent 10 stores a copy of data that is valid and possesses the same value as is stored in external memory. An agent 10 may only read data in shared state. Copies of the data may be stored with other agents also in shared state. An agent 10 may not modify data in shared state without first performing an external bus transaction to gain exclusive ownership of the data.

Exclusive—The agent 10 stores a copy of data that is valid and may possess the same value as is stored in external memory. When an agent 10 caches data in exclusive state, it may read and modify the data without an external cache coherency check.

Modified—The agent 10 stores a copy of data that is valid and "dirty." A copy cached by the agent 10 is more current than the copy stored in external memory. When an agent 10 stores data in modified state, no other agents possess a valid copy of the data.

Agents 10–50 exchange cache coherency messages, called "snoop responses," during external bus transactions. The snoop responses identify whether other agents possess copies of requested data and, if so, the states in which the other copies are held. For example, when an agent 10 requests data held in modified state by another agent 20, the other agent 20 may provide the data to the requesting agent in an implicit writeback. Ordinarily, data is provided to requesting agents 10 by the external memory 50. The modified data is the most current copy of data available to the system and should be transferred to the requesting agent 10 in response to a data request.

When external bus transactions cause an agent to change the state assigned to a copy of data, state changes occur after snoop responses are globally observed.

As an example, consider a "read for ownership" request issued by an agent 10. Initially, an agent 10 may store the requested data in an invalid state. The agent 10 has a need for the data and issues a bus transaction requesting it. The agent 10 receives snoop responses from other agents 20–40. When the snoop responses are received, the transaction is globally observed. The agent 10 marks the requested data as held in exclusive state. The agent 10 may mark the data even though it has not yet received the requested data. For example, in known processors, data is transferred in a data phase of a transaction following a snoop phase. Before the data is received, an entry of an internal cache (not shown) is reserved for the data. A state field in the external transaction queue is marked as exclusive when the transaction is globally observed and before the requested data is received, but the state field in the reserved cache entry is not marked exclusive until the data is filled into the cache.

Certain boundary conditions arise when state transitions are triggered by the receipt of snoop responses. An example is shown in the following table using the Pentium® Pro bus protocol:

|  | Bus Clocks | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Transaction No. 1 | Req | Req | Err |  | Snoop | Stall |  | Snp | Resp | Data | X |
| State in Agent 10 | I | I | I | I | I | I | I | E | E | E | E |
| Transaction No. 2 | X | X | Req | Req | Err | Snoop | Stall |  | Snp | Resp | Data |
| State in Agent 20 | I | I | I | I | I | I | I | I | E | E | E |

In The boundary condition, without some sort of preventative measure, two different agents 10 and 20 in the system could mark a copy of the same data in exclusive state. To do so would violate cache coherency. Assume that two agents 10 and 20 post read requests to a single piece of data. The first agent 10 posts the request as explained above. When the first transaction concludes its request phase, the second agent 20 posts a second transaction for the same data.

Assume further that the snoop phase of the first transaction is stalled by a snoop stall. A snoop stall signal occurs when an agent (say, agent 30) requires additional time to generate snoop results. Although the first agent 10 may reserve a cache entry for the requested data, the agent 10 does not mark the requested data as exclusive until snoop results for its transaction are received. When snoop results eventually are received for the first transaction (in clock 8), the first agent 10 will mark the data as held in exclusive state. However, the first agent 10 observes the second transaction in clock 3. If it performs internal snoop inquiries for the second transaction before the first transaction is globally observed, its snoop response would indicate that it does not possess a valid copy of the data. The second agent 20 also could mark the data as exclusive. Having two agents 10, 20 each store data in exclusive state violates the MESI cache coherency rules because each agent 10, 20 could modify its copy of the data without notifying the other via a bus transaction.

The coherency violation can arise if an agent 10 begins internal snoop inquiries before its previous transaction to the data is globally observed. Thus, the error can be avoided if the snoop inquiries related to the second transaction are blocked until a prior conflicting transaction related to the same data is globally observed.

The Pentium® Pro processor includes a snoop queue to manage cache coherency and generate snoop responses. The snoop queue buffers all transactions posted on the external bus. For new transactions, the snoop queue compares the address of the new transaction to addresses of transactions that it previously stored to determine whether the addresses match. If so, and if the previous transaction were not globally observed, the snoop queue blocks a snoop probe for the new transaction. The block remains until snoop results for the prior pending transaction are received.

The Pentium® Pro processor's snoop queue is large. The snoop queue possesses a queue entry for as many transactions as can be pending simultaneously on the external bus. It consumes a large area when the Pentium® Pro processor is manufactured as an integrated circuit. In future processors, it will be desirable to increase the pipeline depth of the external bus to increase the number of transactions that may proceed simultaneously thereon. However, increasing the depth of the external bus becomes expensive if it also requires increasing the depth of the snoop queue.

The Pentium® Pro processor's snoop queue fills quickly during operation. The snoop queue buffers not only requests from other agents but also requests posted by the agent to which the snoop queue belongs. Because the Pentium® Pro includes an external transaction queue that monitors transactions issued by the processor, the snoop queue's design is considered sub-optimal.

Accordingly, the inventors perceived a need in the art for a snoop queue in an agent that possesses a depth that is independent of the pipeline depth of the agent's external bus. There is a need in the art for such a snoop queue, however, that maintains cache coherency and insures that, when two bus transactions related to the same address are pending on the external bus at the same time, snoop inquiries related to the second transaction will not be generated until the first transaction has been globally observed.

SUMMARY

Embodiments of the present invention provide a method of processing a bus transaction in which an address is retrieved from the bus transaction and referred to a queue of pending transactions. A match indicator signal is returned from the queue. If the match indicator signal indicates a match, a snoop probe for the bus transaction is blocked.

BRIEF DESCRIPTION OF THE DRAWINGS

FIG. 4 is a block diagram illustrating relevant portions of an external transaction queue and a snoop queue constructed in accordance with an embodiment of the present invention.

DETAILED DESCRIPTION

The present invention alleviates the disadvantages of the prior art by providing an agent having a snoop queue whose depth is independent of the pipeline depth of its external bus. Embodiments of the present invention provide a snoop queue with a snoop blocking function that is coordinated with an external transaction queue. When the snoop queue observes an external bus transaction, before it issues a snoop probe for cache coherency checks, it refers the address of the new transaction to the external transaction queue. The external transaction queue compares the address of the new transaction with addresses of earlier-posted transactions that have not yet been globally observed. If a match occurs, the external transaction queue identifies the match to the snoop queue which in turn, blocks a snoop probe for the new transaction. After the pending transaction has been globally observed, the block is released.

Figure 1:
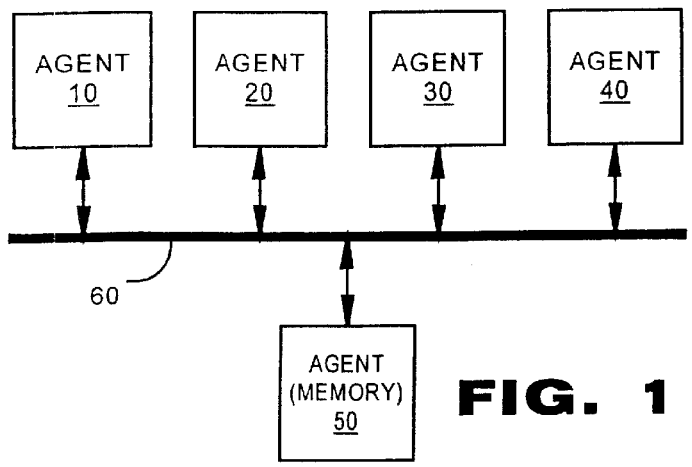
FIG. 1 is a block diagram of a conventional multi-agent system.
Figure 2:
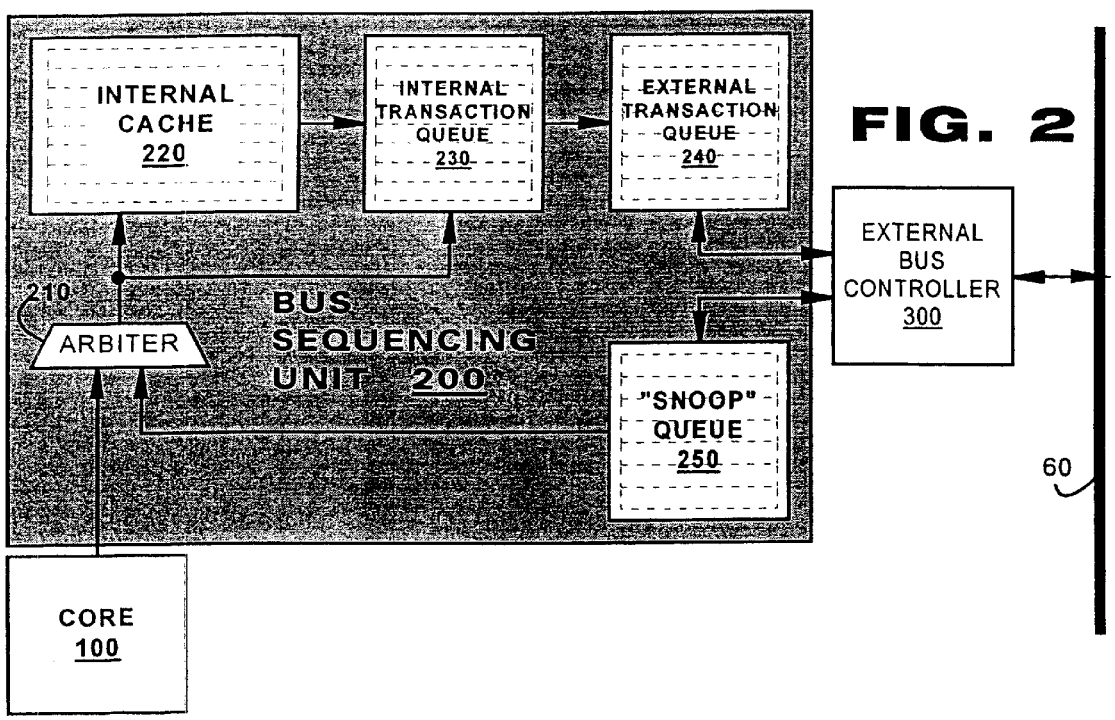
FIG. 2 is a block diagram of a bus sequencing unit of an agent constructed in accordance with an embodiment of the present invention.

In an embodiment, the principles of the present invention may be applied in a bus sequencing unit 200 ("BSU") of an agent, shown in FIG. 2. The BSU 200 includes an arbiter 210, an internal cache 220, an internal transaction queue 230, an external transaction queue 240 and the snoop queue 250. An external bus controller 300 interfaces the BSU 200 to the external bus 60. The BSU 200 fulfills data requests issued by, for example, an agent core 100.

The arbiter 210 receives data requests from not only the core 100 but also from a variety of other sources such as the snoop queue 250. Of the possibly several data requests received simultaneously by the arbiter 210, the arbiter 210 selects and outputs one of them to the remainder of the BSU 200.

The internal cache 220 stores data in several cache entries. It possesses logic responsive to a data request to determine whether the cache 220 stores a valid copy of requested data and, if so, it furnishes the requested data in response thereto.

The internal transaction queue 230 receives and stores data requests issued by the arbiter 210. It coordinates with the internal cache 220 to determine if the requested data "hits" (was furnished by) the internal cache 220. If not, if a data request "misses" the internal cache 220, the internal transaction queue 230 forwards the data request to the external transaction queue 240.

The external transaction queue 240 interprets data requests and generates external bus transactions to fulfill them. The external transaction queue 240 is populated by several queue entries. The external transaction queue 240 manages the agent's transactions as they progress on the external bus 60. For example, when data is available in response to a transaction, the external transaction queue 240 retrieves the data and forwards it to, for example, the core 100.

The snoop queue 250 performs cache coherency checks within the agent. Typically, in response to a new bus transaction issued by another agent, the snoop queue 250 generates snoop probes to various caches within the agent (such as internal cache 220) and to the internal and external transaction queues 230, 240. It receives responses to the snoop probes and generates snoop responses therefrom. If necessary, the snoop queue 250 manages implicit writebacks of modified data from the agent.

The external bus controller 300 drives signals on the external bus as commanded by the external transaction queue 240 and snoop queue 250.

Figure 3:
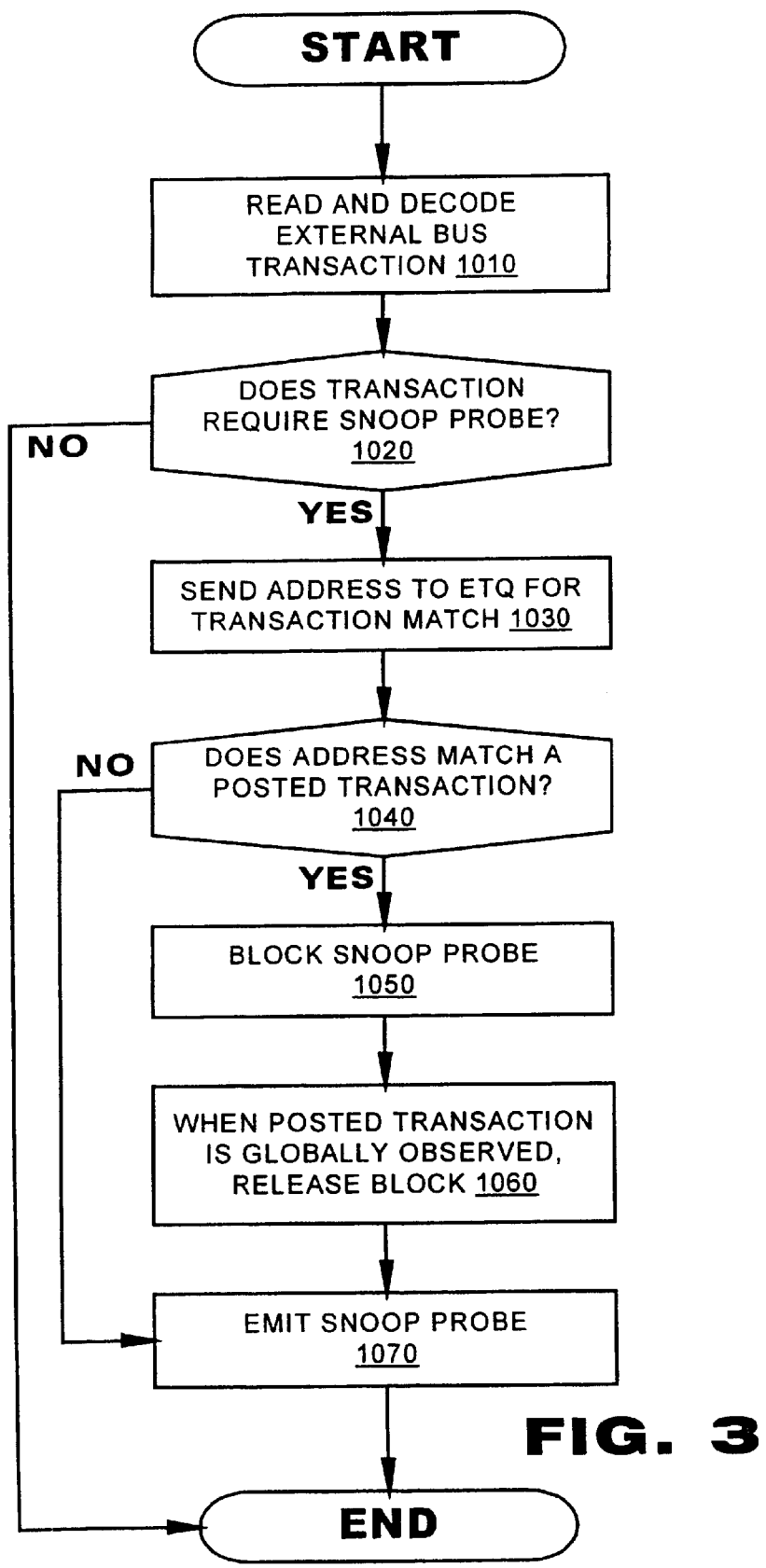
FIG. 3 is a flow diagram illustrating operation of a snoop queue in accordance with an embodiment of the present invention.

FIG. 3 illustrates a method 1000 of the snoop queue 250 operating in accordance with an embodiment of the present invention. It may begin when another agent requests data in a bus transaction. When a new transaction is posted, the snoop queue 250 decodes the transaction (Step 1010). It determines whether the transaction requires a cache coherency check. If so, the transaction requires a snoop probe (Step 1020). The snoop queue 250 then provides the address of the requested data to the external transaction queue 240 (Step 1030). Based upon a response from the external transaction queue, the snoop queue determines whether the address of the new transaction matches the address of a posted transaction (Step 1040). If so, the snoop queue blocks a snoop probe related to the new transaction (Step 1050).

Eventually, the prior conflicting transaction will be globally observed. When that occurs, the snoop queue releases the block (Step 1060). It emits a snoop probe within the agent and generates a snoop response according to conventional techniques (Step 1070).

If, at Step 1040, no match occurred, the snoop queue 250 advances to Step 1070 and emits the snoop probe.

FIG. 4 is a partial block diagram of the external transaction queue 240 and the snoop queue 250. The external transaction queue 240 is populated by a number of queue entries ("ETQ entries") 242. For each pending bus transaction posted by the external transaction queue 240, one of the ETQ entries 242 stores information regarding the transaction. Such information may include the request type, the address of the transaction and/or the current phase of the transaction. The address field of each ETQ entry 242 includes match detection logic 244. The external transaction queue also includes observation logic 246 in communication with the match detection logic 244 and with the snoop queue 250.

During operation, the external transaction queue 240 receives an address of a new transaction from the snoop queue 250. The observation detection logic 246 forwards the received address to each match detection logic 244. It also observes outputs of the match detection logic 244 to determine whether the address stored in any ETQ entry 242 matches the received address. In the event of a match, the observation detection logic 246 reads the phase from the matching ETQ entry 242 and determines whether the matching transaction has already been issued onto the bus, but not yet been globally observed. If so, the observation detection logic 246 signals to the snoop queue that a conflict match exists.

The snoop queue 250 is also populated by a plurality of entries ("snoop queue entries") 252. The number of snoop queue entries 252 is independent of the pipeline depth of the external bus 60. It is also independent of the number of ETQ entries 242. The snoop queue 250 possesses control logic 254 to implement the method of FIG. 3. It forwards the address of new transactions to the external transaction queue 240. The control logic 254 also receives the match signal from the external transaction queue 240. Each snoop queue entry 252 includes a blocking bit (not shown) which, if enabled, prevents the snoop queue 240 from issuing a snoop probe. Responsive to a match signal from the external transaction queue, the control logic 254 enables the blocking bit. The blocking bit remains enabled until the pending conflicting transaction is globally observed. Thereafter, the bit is cleared and a snoop probe may be issued.

In an embodiment, each of the ETQ entries 242 is assigned a unique identifier ("ETQ ID"). When a conflict match exists, the observation detection logic 246 may provide the ETQ ID of the conflicting transaction to the snoop queue 250.

In an embodiment where the external transaction queue 240 furnishes the ETQ ID of a pending conflicting transaction, the snoop queue 240 may store the ETQ ID in a snoop queue entry 252 of the new transaction when it enables the blocking bit. In this embodiment, when the EBC 300 receives snoop responses, it forwards them to both the external transaction queue 240 and the snoop queue 250. The EBC 300 relates the snoop response to a transaction using its ETQ ID. Upon receipt of the snoop responses and the ETQ ID, the snoop queue 250 releases the blocking bit of all snoops which were being blocked by the associated ETQ transaction.

Optionally, the snoop queue 250 may be configured to ignore certain types of transactions. For example, a conflicting write back transaction does not raise coherency issues for a subsequent transaction because global observation of the write transaction does not necessarily mean that the agent is giving up ownership of the cache line. Also, an "uncacheable read," one that causes an agent to read but not cache requested data, does not cause state changes to occur within the agent when the read transaction is globally observed. In this embodiment, the observation detection logic 246 also reads the request type out of the ETQ entry 242 of the matching pending transaction. Further, a "self snoop," another transaction identified by its request type, need not block a transaction. The observation logic 246, based on the request type, may not indicate "block" even though an address match occurred with an outstanding transaction.

Thus the present invention provides a snoop queue having a reduced queue size. The snoop queue of the present invention severs the relationship between the depth of the snoop queue and the pipeline depth of the external bus. The snoop queue of the present invention includes a snoop probe blocking feature to eliminate the boundary conditions that may exist when two agent issue transactions requesting the same data.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A transaction management method for a computer system, comprising:
   by a first integrated circuit, posting a first transaction on an external bus that requests a copy of addressed data,
   by a second integrated circuit:
      determining whether the second integrated circuit previously posted on the external bus a second transaction directed to the addressed data,
      if so, blocking an internal snoop probe responsive to the first transaction until the second transaction is globally observed, and when the second transaction is globally observed, issuing the snoop probe and posting on the external bus a snoop response responsive to the first transaction, by the first integrated circuit, when the snoop response is available on the external bus, changing a cache coherency state associated with the addressed data in a storage location of the first integrated circuit.

2. The transaction management method of claim 1, further comprising following generation of the snoop response, transferring the addressed data from the second agent to the first agent.

3. The transaction management method of claim 1, further comprising following generation of the snoop response, transferring the addressed data from system memory to the first agent.

4. In a first queue of an integrated circuit, a method of processing a transaction on an external bus, comprising:

retrieving an address from data of the transaction, referring the address to a second queue of the integrated circuit that stores only data of transactions issued by the integrated circuit, receiving a match indicator signal there from, and unless the match indicator indicates a match, collecting from components within the integrated circuit cache coherency state data of copies of the addressed data stored by those components.

5. A bus interface system for an integrated circuit, comprising:

an arbitration system to field requests from a processing core of the integrated circuit, a request queue to process the core requests, the request queue noting for each core request queued therein both an address and a progress state, the progress state distinguishing those core requests that are in progress on an external bus from those core requests that have yet been issued on the bus, a snoop queue to process requests received by the integrated circuit from the bus, the snoop queue issuing internal snoop probes for a newly received request unless the snoop queue determines that the request does store a core request directed to the same address as a request stored in the request queue that is in progress on the bus.

6. The bus interface system of claim 5, wherein:

the request queue and the snoop queue each comprise a plurality of entries, and each snoop queue entry includes a field for storage of a pointer to a request queue entry.

7. The bus interface system of claim 5, wherein the issuing comprises issuing snoop probes to internal components of the integrated circuit, the snoop probes causing the components to alter a cache coherency identifier of any component in which the snoop probe hits.

8. A transaction management method for a computer system, comprising:

by a first integrated circuit, posting a first transaction on an external bus that requests a copy of addressed data, by a second integrated circuit:

identifying all transactions that are pending on the external bus at the time the first transaction was posted and were posted by the second integrated circuit, determining whether any such transactions are directed to the same address as the first transaction, if so, blocking an internal snoop probe responsive to the first transaction until the second transaction is globally observed, and when the second transaction is globally observed, issuing the snoop probe and posting on the external bus a snoop response responsive to the first transaction, by the first integrated circuit, when the snoop response is available on the external bus, changing a cache coherency state associated with the addressed data in a storage location of the first integrated circuit.

9. The transaction management method of claim 8, further comprising following generation of the snoop response, transferring the addressed data from the second agent to the first agent.

10. The transaction management method of claim 8, further comprising following generation of the snoop response, transferring the addressed data from system memory to the first agent.

\* \* \* \* \*